United States Patent [19]
Cash et al.

[11] Patent Number: 5,510,844
[45] Date of Patent: Apr. 23, 1996

[54] VIDEO BITSTREAM REGENERATION USING PREVIOUSLY AGREED TO HIGH PRIORITY SEGMENTS

[75] Inventors: Glenn L. Cash, Matawan; Mehmet R. Civanlar, Red Bank, both of N.J.

[73] Assignee: AT&T Corp., Murray Hill, N.J.

[21] Appl. No.: 341,787

[22] Filed: Nov. 18, 1994

[51] Int. Cl.$^6$ .................................................. H04N 7/12
[52] U.S. Cl. ........................... 348/465; 348/466; 348/426
[58] Field of Search ..................................... 348/465–467, 348/426, 432, 385, 390, 409, 437; 375/261, 265; H04N 7/12

[56] References Cited

U.S. PATENT DOCUMENTS

| | | | |
|---|---|---|---|
| 5,214,656 | 5/1993 | Chang | 375/261 |
| 5,231,486 | 7/1993 | Acampora | 348/461 |
| 5,243,629 | 9/1993 | Wei | 348/437 |
| 5,394,440 | 2/1995 | Goldstein et al. | 375/265 |

*Primary Examiner*—Victor R. Kostak
*Attorney, Agent, or Firm*—John A. Caccuro

[57] ABSTRACT

Apparatus for and method of sending a video bitstream, including a plurality of high priority segments and associated low priority segments, by transmitting only the low priority segments from a transmitter over a facility to a receiver is disclosed. The transmitter and receiver locations are arranged to use previously agreed-to high priority information (e.g., predefined high priority segments or format for generating same) and, consequently, only the low priority segments of the video bitstream need to be transmitted to the receiver. At the receiver, the high priority segments are obtained (from storage or generated using the agreed-to format) and interleaved in real time with the received low priority segments to recreate an interleaved video bitstream.

14 Claims, 6 Drawing Sheets

FIG. 5 PRIOR ART

TABLE 7-28

| PRIORITY_BREAK POINT | SYNTAX ELEMENTS INCLUDED IN PARTITION ZERO |
|---|---|
| 0 | THIS VALUE IS RESERVED FOR PARTITION 1. ALL SLICES IN PARTITION 1 SHALL HAVE A PRIORITY_BREAKPOINT EQUAL TO 0 |
| 1 | ALL DATA AT THE SEQUENCE, GOP, PICTURE AND SLICE() DOWN TO EXTRA_BIT_SLICE IN SLICE(). |
| 2 | ALL DATA INCLUDED ABOVE, PLUS MACROBLOCK SYNTAX ELEMENTS UP TO AND INCLUDING MACROBLOCK_ADDRESS_INCREMENT. |
| 3 | ALL DATA INCLUDED ABOVE, PLUS MACROBLOCK SYNTAX ELEMENTS UP TO AND INCLUDING CODED_BLOCK_PATTERN(). |
| 4 ... 63 | RESERVED |
| 64 | ALL SYNTAX ELEMENTS UP TO AND INCLUDING CODED_BLOCK_PATTERN() OR DC COEFFICIENT (dct_dc_differential),AND THE FIRST(RUN,LEVEL) DCT COEFFICIENT PAIR(OR EOB). |
| 65 | ALL SYNTAX ELEMENTS ABOVE, PLUS UP TO 2 (RUN LEVEL) DCT COEFFICIENT PAIRS. |
| ... | |
| 63+j | ALL SYNTAX ELEMENTS ABOVE, PLUS UP TO j (RUN LEVEL) DCT COEFFICIENT PAIRS. |
| ... | |
| 127 | ALL SYNTAX ELEMENTS ABOVE, PLUS UP TO 64 (RUN LEVEL) DCT COEFFICIENT PAIRS. |

VIDEO BITSTREAM REGENERATION USING PREVIOUSLY AGREED TO HIGH PRIORITY SEGMENTS

CROSS-REFERENCE TO RELATED APPLICATION

Related subject matter is disclosed in the following application filed concurrently herewith and assigned to the same assignee hereof: U.S. continuation-in-part patent application Ser. No. 08/342,404, allowed on Aug. 28, 1995 entitled "Method Of And Apparatus For Video Bitstream Transmission Over Packet Networks," inventors G. L. Cash and M. R. Civanlar.

TECHNICAL FIELD

This invention relates to video transmission and, more particularly, to a technique for transmitting compressed previously stored video over lossy packet networks in real time so as to reduce the effects of packet losses on the quality of the received video.

BACKGROUND OF THE INVENTION

Transmission of stored compressed video over lossy packet networks has a number of important applications including movies-on-demand, interactive television, and corporate educational video distribution. Most of the present and planned packet networks, particularly Asynchronous Transfer Mode (ATM) networks, exhibit packet loss. Since compression reduces redundancy in the video signal, losing random parts of a compressed video bit-stream may cause drastic reduction in the quality of the received video. It is a continuing problem to improve the quality of video transmission over such packet networks.

SUMMARY OF THE INVENTION

The present invention discloses apparatus and method of transmitting a video bitstream from a transmitter over a packet network to a receiver, the video bitstream including a plurality of high priority segments and low priority segments. The high priority segments contain vital control information such as the codes that define the start of pictures and picture header information. The low priority segments contain the rest of the bitstream. As an example, the high priority and low priority segments may be determined in accordance with the well-known MPEG-2 draft standard (see Generic Coding of Moving Pictures and Associated Audio, Recommendation H.262. ISO/IEC 13818-2. March 1994). According to the present invention, the transmitter and receiver locations use agreed-to high priority information (e.g., predefined high priority segments, or format for generating same) and consequently only the low priority segments of the video bitstream need to be transmitted to the receiver. At a receiver location, the high priority segments are obtained (from storage or generated using the agreed-to format) and are interleaved with the received low priority segments in real time to recreate the video bitstream.

BRIEF DESCRIPTION OF THE DRAWING

In the drawing,

FIG. 5 shows Table 7–28 of the MPEG-2 draft standard illustrating priority break points.

DETAILED DESCRIPTION

Figure 1:
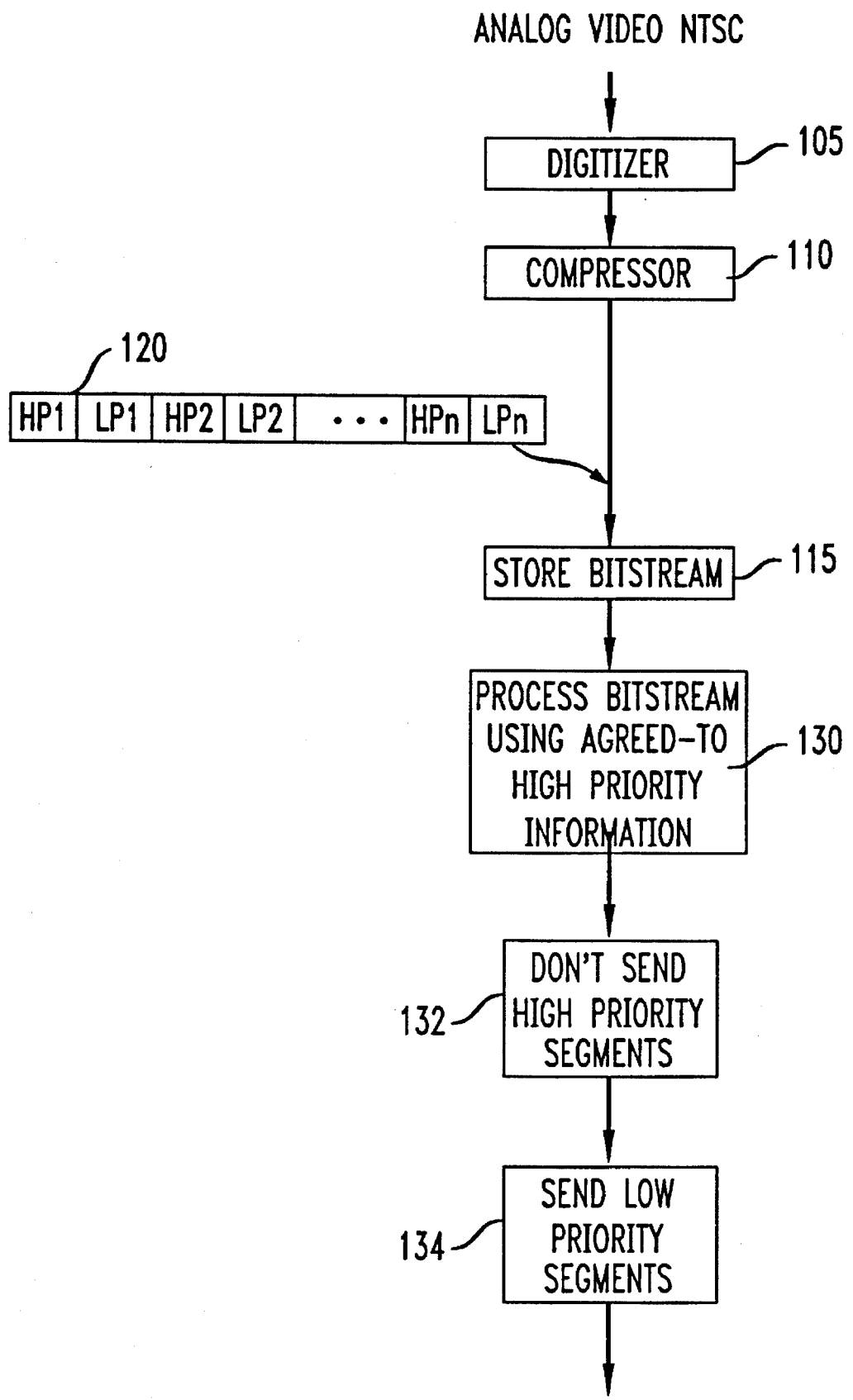
FIG. 1 shows a diagram of our inventive method for the compression, storage and transmission of low priority segments.

With reference to FIG. 1, we describe how the present invention is used for transmitting low priority portions of video information over a packet network. Analog video signals associated with each video program (or video segment) are received in the standard NTSC, PAL, etc., formats, digitized in digitizer 105, compressed in compressor 110 and the resulting compressed video bitstream is stored in a disc 115. Illustratively, the well-known format of a video bitstream of a video segment is shown by 120. As shown, the illustrative video bitstream data for a video segment includes a plurality of high priority (e.g., HP1) and low priority (e.g., LP1) segments. In an encoded bitstream, the partition boundaries (e.g., that between HP1 and LP1) cannot be determined without some processing. This "data partitioning" is described in the above-identified MPEG-2 standard as a technique that splits a video bitstream into two layers called partitions. A priority breakpoint indicates which syntax elements are placed in partition 0, which is the base partition (also called high priority partition). The remainder of the bitstream is placed in partition 1 (which is also called low priority partition). The interpretation of "priority_breakpoint" is given in Table 7–28 on page 113 of the MPEG-2 standard, which is reproduced herein as FIG. 5.

In the prior art, when a request for a video segment is received, the video bitstream 120 is obtained from storage 115 and processed by a priority transmitter unit (not shown in FIG. 1) so that the high priority partition (e.g., segments HP1–HPn) is sent over a high priority channel of a transmission facility and the low priority partition (e.g., segments LP1–LPn) is sent over a low priority channel of the facility. In such an arrangement, the high priority channel is typically one having a high probability of delivery, while the low priority channel is one having a substantially lower probability of delivery. Undesirably, facilities which connect to a packet network may only have channels which operate at one error rate. In such an arrangement, the prior art techniques may not be as useful.

In accordance with the present invention, an apparatus for and method of sending a video bitstream, including a plurality of high priority segments and associated low priority segments, by transmitting only the low priority segments from a transmitter over a facility to a receiver is disclosed. The transmitter and receiver locations are arranged to use previously agreed-to high priority information (e.g., predefined high priority segments or format for generating same) and, consequently, only the low priority segments of the video bitstream need to be transmitted to the receiver. At the receiver, the high priority segments are obtained (from storage or generated using the agreed-to format) and interleaved in real time with the received low priority segments to recreate an interleaved video bitstream.

As shown in step 130 of FIG. 1, a server processor obtains the stored bitstream 115 and processes it using previously agreed-to high priority information (e.g., the format shown in FIG. 6) to generate the low priority segments (also referred to herein as a low priority partition). In step 132, the agreed-to high priority information is not sent to the client receiver; rather, in step 134, only the low priority segments are sent.

Figure 2:
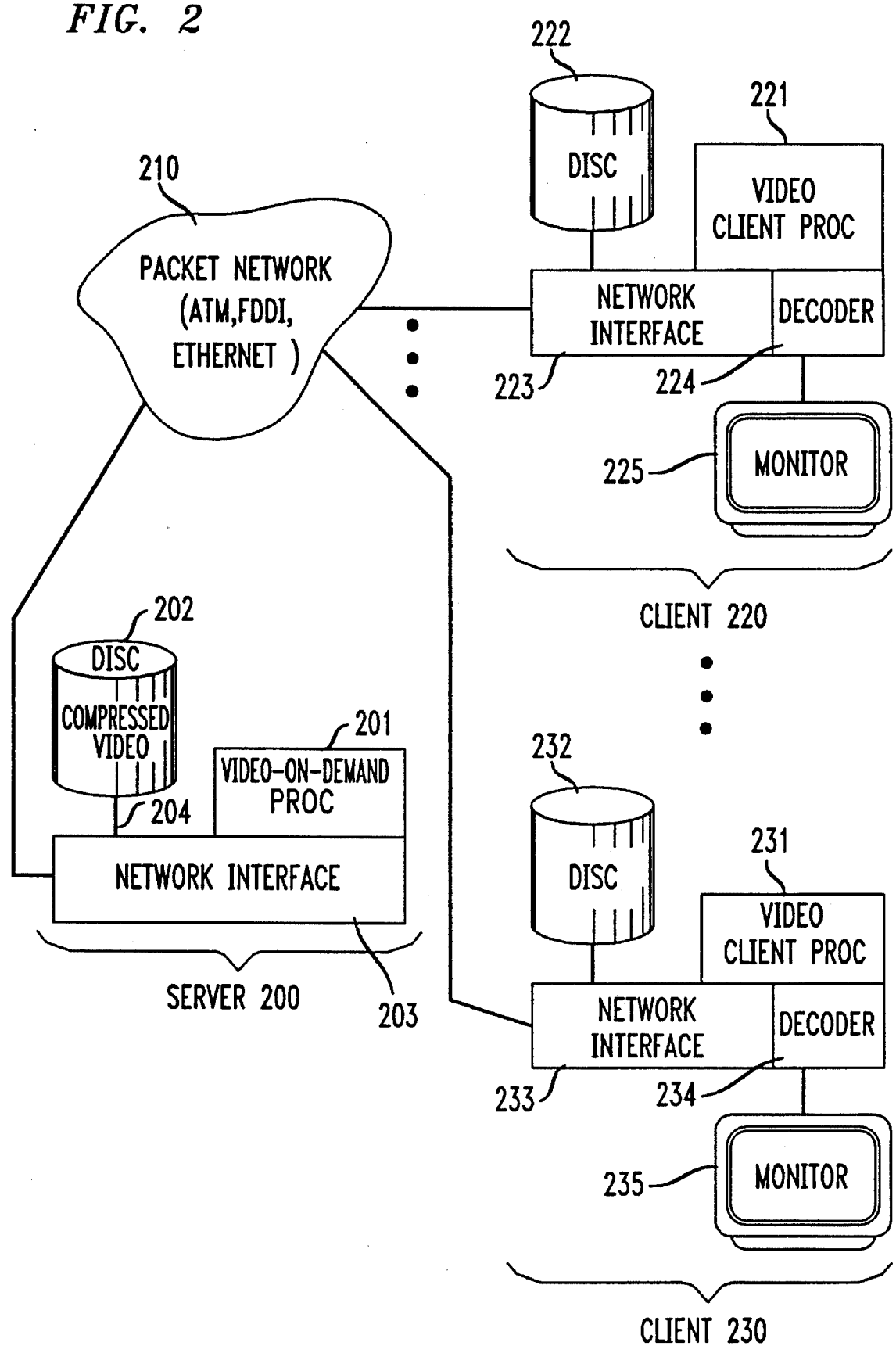
FIG. 2 shows an illustrative client server video distribution useful in understanding the present invention.

With reference to FIG. 2, we describe an illustrative server/client network in which the present invention may be utilized. Such a network includes a server location 200 which connects via packet network 210 to a plurality of clients 220–230. Server location 200 includes a video-on-demand server/processor 201 which controls the operation of the hard disc 202 and network interface 203. The hard disc 202 is used to store the compressed video bitstreams. It should be noted that all of the compressed video data stream need not be stored locally on disc 202, but may be remotely stored, as part of a remote file server, and accessible via facility 204 (e.g., a local area network).

The network interface 203 is utilized to transmit and receive using the protocols required by the packet network 210. The processor 201 performs the functions illustrated at the server portion of the flowchart of FIG. 4.

The packet network 210 may be an Asynchronous Transfer Mode (ATM) network, an FDDI, an Ethernet or other similar packet networks.

Figure 4:
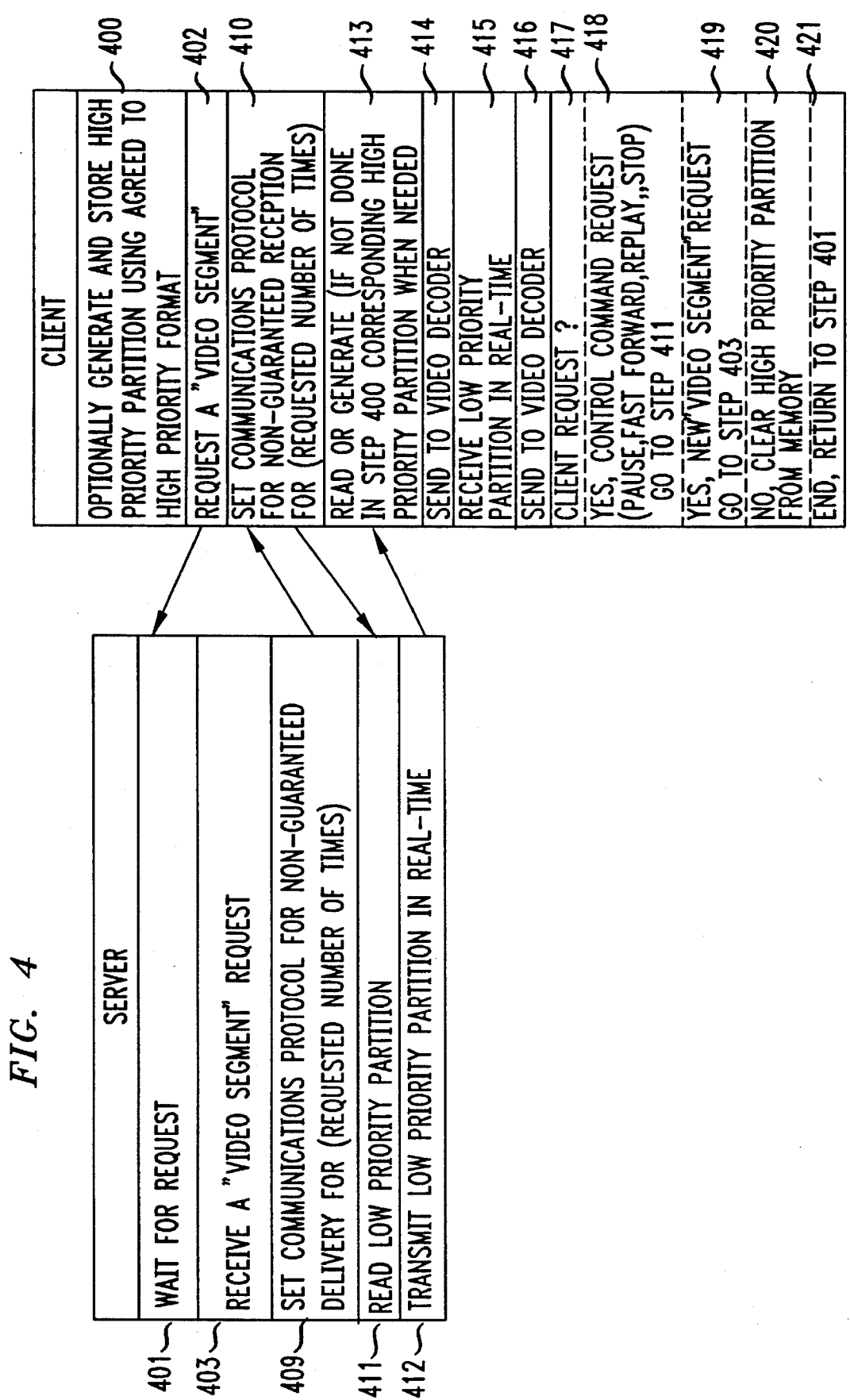
FIG. 4 is a flowchart describing the server and client interactions for handling video segment requests.

A client location, e.g., 220, includes a network interface 223 for convening communication protocols received from and transmitted over a facility connected to packet network 210. The video client processor 221 processes the previously stored agreed-to high priority information to generate the high priority segments which are interleaved in real time with the received low priority segments as illustrated in the flowchart of FIG. 4. A disc 222 is used to store the generated high priority segments. Processor 221 interleaves the high priority segments with the low priority data received by network interface 223 and then sends the interleaved data to decoder 224. The output of decoder 224 is the requested video segment which is then displayed on the client monitor 225.

Similarly, client 230 includes processor 231, disc 232, network interface 233, decoder 234 and monitor 235.

Shown by 310 is the raw compressed video bitstream data for video segments 1–n, where the high priority and low priority portions are HP1–HPn and LP1–LPn, respectively. In the raw compressed data stream, the separation between the high priority (e.g., HP1) and low priority (e.g., LP1) data portion can be defined based on priority breakpoints. These priority breakpoints can have a variety of values as shown in FIG. 5 which illustrates Table 7–28 of the previously referenced MPEG-2 standard. With reference to 310 of FIG. 3, HP1 would include sequence start, GOP and picture header 1. The picture header also includes a time or frame identifier. The sequence start header includes data defining the vertical and horizontal resolution of the video segment. A video segment includes multiple pictures (or frames). The picture (or frame) rate may be from 24 per second for motion pictures to 30 per second for broadcast television. Each picture (or frame) may include a plurality of slices. The GOP data is optional, and includes the picture coding utilized for the segment. The picture header 1 includes the header information for all slices of picture 1 (or frame 1). The low priority data portion LP1 includes the rest of the bitstream for picture 1. Additionally, in accordance with the present invention, the low priority data portion LP1 may include time and frame identifiers corresponding to that of HP1. Similarly, each of the high priority data portions HP2 through HPn include at least the headers for the slices of the associated picture. The length of each video segment may be different and have a different number of high priority and low priority data portions within each segment. Note that the size of the low priority data portions LP1–LPn may be different lengths due to picture content.

In accordance with the present invention, the previously agreed-to high priority information, illustrated in Table 339, can be based on the breakpoint values 0 and 1 shown in Table 7–28 (FIG. 5).

The agreed-to high priority information may take any of a variety of forms including, illustratively, a format derived from an international standard, a client/server agreed-to high priority format, or a predefined high priority partition. When a video bitstream for each video segment is received, the network server 200 must then process the data stream using the previously agreed-to high priority information (e.g., using one of the formats shown in Table 339) to obtain the low priority segments associated with each video program. These low priority segments for each video segment are then stored as compressed video on disc 202. It should be noted that the agreed-to high priority information may use 0–1 of the priority breakpoints of Table 7–28 of FIG. 5. Illustratively, in one embodiment the agreed-to high priority format includes those data items of priority breakpoint 1 shown in Table 7–28 of FIG. 5.

Figure 6:
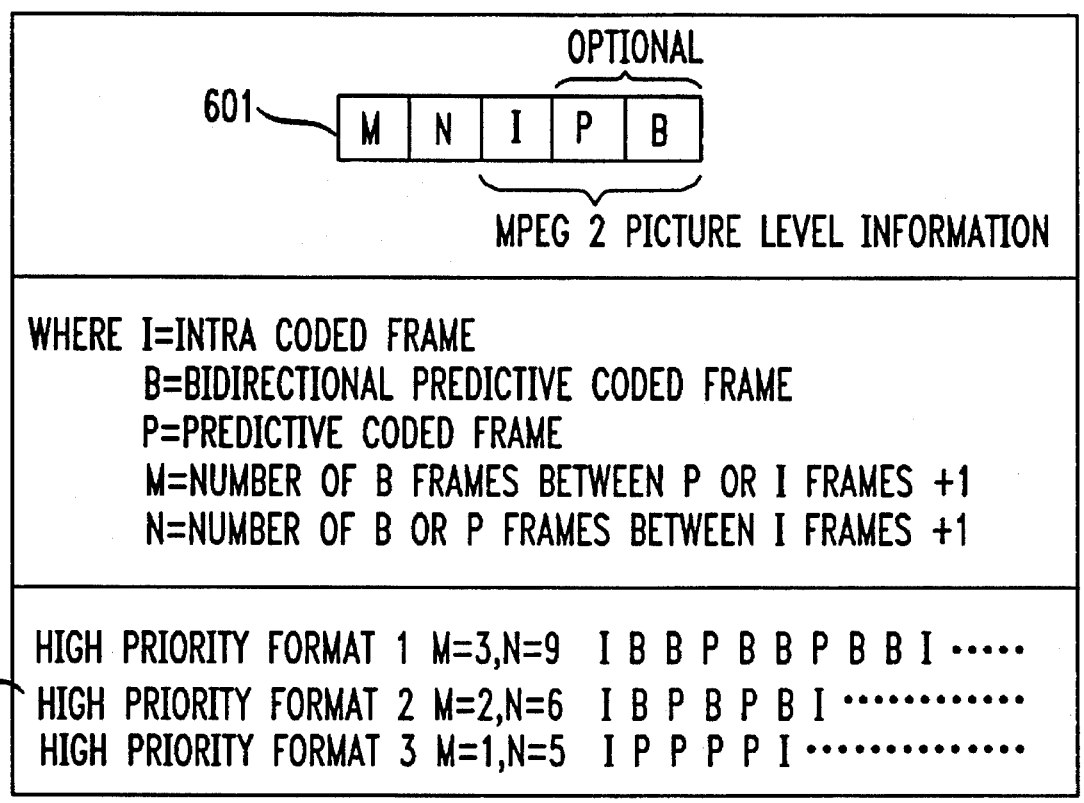
FIG. 6 shows an example of an agreed-to high priority format.

With reference to FIG. 6, we illustrate an example of a previously agreed-to high priority standard format (341 of Table 339) which may be used by server 200 and a client. As shown by 601, the format includes an M and N number and MPEG-2 picture level information. As shown, the MPEG-2 picture level information includes an I and, optionally, a P and/or B frame. As shown, the M specifies the number of B frames between P or I frames+1 and N specifies the number of B or P frames between I frames+1, where I is the intra-coded frame, B is the bidirectional coded frame, and P is the predictive coded frame. Shown in 602 are several examples of different M and N values for high priority formats 1, 2 and 3.

Returning to FIG. 2, it should be noted that the processing of the bitstream data to obtain low priority segments may be done by server 200 or the low priority segments may be received in processed form by server 200 and downloaded to disc 202.

Figure 3:
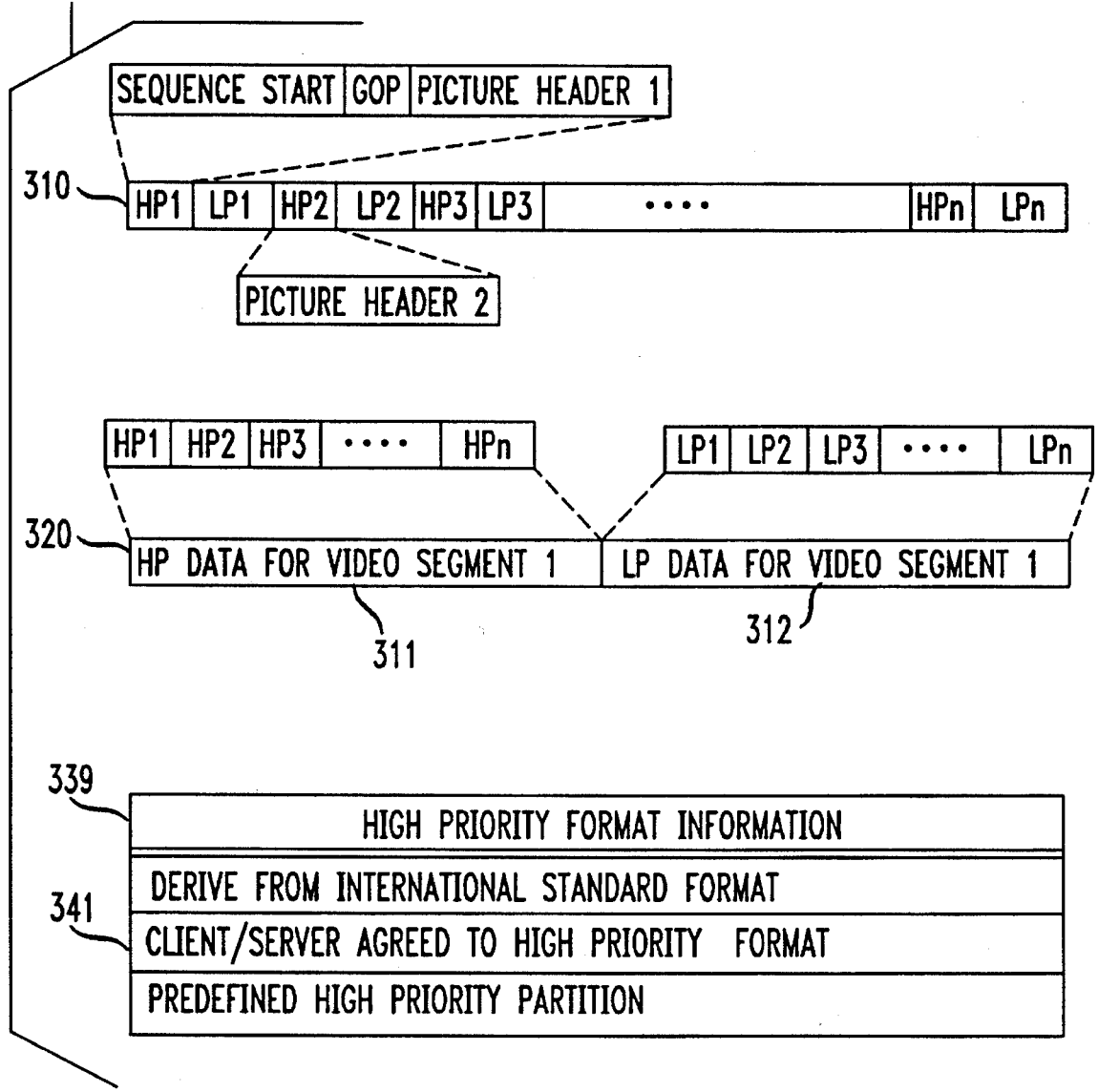
FIG. 3 shows various formats for storing the previously agreed-to high priority information at the server location.

With joint reference to FIGS. 2, 3, and the flowchart of FIG. 4, we describe the server and client interaction for handling video segment requests from a client.

In step 400, the client may either store the agreed-to high priority information (e.g., an algorithm or format for generating a high priority partition) or may optionally generate and store the high priority partition itself. In step 401, server 200 is in a wait state, waiting for a client request. In step 402, a client 220 requests a particular video sequence or segment. In step 403, network server 200 receives the client's video segment request.

In step 409, the server 200 sets the communication protocol for non-guaranteed delivery of the low priority data of the requested video segment to the client 220. In accordance with an aspect of the present invention, the system can limit the number of times that the low priority data of the requested video segment can be sent to the client 220. This ability to multiply send the low priority partition 312 to the client 220 enables the client to have a capability to pause or rewind during the reception of a video segment.

In step 410, client 220 sets a communication protocol for the non-guaranteed reception of the low priority partition.

In step 411, server 200 reads from disc 202 the previously generated low priority data partition 312 or optionally may create the low priority data partition 312 in real time based on the previously agreed-to high priority information (of Table 339). In step 412, server 200 transmits the low priority data partition 312 in real time to client 220. The packets containing the LP data may include frame numbers, time stamps, sequence numbers enabling resynchronization to the associated HP data at the client decoder 224 in the case of LP packet loss.

In step 413, client processor 221 may optionally read the previously generated (in step 400) high priority partition from memory or generate it in real time and, in step 414, send it to video decoder 224. In step 415, client 220 receives the low priority data segment in real time from server 200 and sends it in step 416 to video decoder 224. The steps 414 and 416 are coordinated by processor 221 so that the stored high priority partition is interleaved in real time with the received low priority partition sent to video decoder 224. The interleaved data would have the original raw compressed data stream format shown by 310. Video decoder 224 then converts the interleaved data to the display format needed to enable monitor 225 to display the requested video segment.

In step 417, client 220 can request to replay the video segment. If a control command request is made, in step 418, control returns to step 411. A control command request may be the well-known VCR-type request including stop, pause, fast forward, fast backward, replay, etc. The stop command instructs the server 200 to not send any additional low priority data. The pause command performs the stop command function but additionally causes decoder 224 to hold the last frame. The fast forward command causes server 200 to send only MPEG-2 I frames of the low priority partition. The fast backward command causes the server 200 to send the I frames in reverse order. The replay command causes server 200 to re-send only the low priority partition. These capabilities may illustratively be implemented consistent with the "Trick modes" described in section D.12 at page 167 of the previously referenced MPEG-2 draft standard.

If the control command requests a new video segment, step 419, control returns to step 403. If no control command request is made, step 420, then processor 221 clears the previously stored high priority data from memory. In step 421 the procedure ends and control returns to the standby state, step 401.

What has been described is merely illustrative of the application of the principles of the present invention. Other arrangements and methods can be implemented by those skilled in the art without departing from the spirit and scope of the present invention.

We claim:

1. A method of transmitting a video bitstream from a transmitter over a facility to a receiver, said method comprising the steps of at the transmitter, processing the video bitstream using previously agreed-to high priority information to obtain low priority segments, and transmitting a low priority partition, including the low priority segments, over the facility in real time using a packet delivery mechanism having a certain probability of success, and at the receiver, receiving the low priority partition, obtaining high priority segments using the previously agreed-to high priority information available at the receiver, and interleaving the high priority segments in real time with associated received low priority segments to recreate an interleaved video bitstream.

2. The method of claim 1 wherein the obtaining step obtains the high priority information which has been previously stored at the receiver as high priority segments.

3. The method of claim 1 wherein the high priority information is a high priority format and wherein the obtaining step uses the format to generate the high priority segments.

4. The method of claim 3 wherein the processing step includes the steps of receiving a video bitstream having high priority segments interleaved with associated low priority segments, and selecting the low priority segments for transmission as part of the low priority partition.

5. The method of claim 1 wherein the low priority partition includes time stamps for at least some of the low priority segments and wherein, at the receiver, the interleaving step associates the high priority segments and the low priority segments using the time stamps received in the low priority partition.

6. The method of claim 1 wherein the low priority partition includes frame identifiers for at least some of the low priority segments and wherein, at the receiver, the interleaving step associates the high priority segments and the low priority segments using the frame identifiers received in the low priority partition.

7. The method of claim 1 further including the steps of at the receiver, requesting a delivery of a bitstream of an identified video segment; and at the transmitter, receiving the video segment request and in response thereto accessing the video bitstream for the identified video segment prior to the transmitting step.

8. The method of claim 1 further including the steps of at the receiver, sending a control command request to the transmitter; and at the transmitter, decoding a received control command request and controlling the transmission of the low priority partition to the receiver in response thereto.

9. The method of claim 8 wherein the control command request is selected from a group of commands including at least stop, pause, fast forward, and replay commands.

10. The method of claim 1 further including the steps of at the receiver, sending a replay command to the transmitter requesting a replay transmission of the low priority partition;

at the transmitter, in response to the replay command, sending a replay transmission of the low priority partition to the receiver; and at the receiver, interleaving each generated high priority segment available at the receiver in real time with each received low priority segment of the low priority partition of the replay transmission received from the transmitter.

11. A method of communicating a video bitstream, over a packet network, comprising the steps of processing the video bitstream using previously agreed-to high priority information to obtain low priority segments;

transmitting the low priority partition over the network using a non-guaranteed delivery mechanism of the network;

receiving the low priority partition at the receiver location; and interleaving segments of a previously agreed-to high priority partition available at the receiver in real time with associated segments of the received low priority partition to recreate the video bitstream.

12. Apparatus for transmitting a video bitstream from a transmitter over a facility to a receiver, the video bitstream including a plurality of high priority segments and associated low priority segments, said apparatus comprising at the transmitter, means for processing the video bitstream using previously agreed-to high priority information to obtain low priority segments, and means for transmitting a low priority partition, including the low priority segments, of the video bitstream over the facility in real time using a packet delivery mechanism having a certain probability of success; and at the receiver, means for receiving the low priority partition, and means for interleaving high priority segments obtained using previously agreed-to high priority information available at the receiver in real time with associated low priority segments to recreate an interleaved video bitstream.

13. Apparatus for transmitting a video bitstream over a facility to a receiver, said apparatus comprising means for receiving a video bitstream;

means for processing the video bitstream using previously agreed-to high priority information to obtain low priority segments; and means for transmitting only a low priority partition, including the low priority segments, of the video bitstream over the facility in real time using a packet delivery mechanism having a certain probability of success.

14. Receiver for reconstructing a video bitstream from information received over a facility from a transmitter, said receiver comprising means for receiving low priority partition information including low priority segments from the transmitter; and means for interleaving high priority segments obtained using previously agreed-to high priority information available at the receiver in real time with the received low priority segments to recreate an interleaved video bitstream.

\* \* \* \* \*